US012532116B2

(12) United States Patent
De Roo et al.

(10) Patent No.: US 12,532,116 B2
(45) Date of Patent: Jan. 20, 2026

(54) MOVEABLE ELEMENT FOR A TRANSDUCER, TRANSDUCER, IN-EAR DEVICE AND METHOD FOR DETERMINING THE OCCURRENCE OF A CONDITION IN A TRANSDUCER

(71) Applicant: SONION NEDERLAND BV, Hoofddorp (NL)

(72) Inventors: Dion Ivo De Roo, Hoofddorp (NL); Michele Colloca, Hoofddorp (NL); Adrianus Maria Lafort, Hoofddorp (NL)

(73) Assignee: Sonion Nederland B.V., Hoofddorp (NL)

( * ) Notice: Subject to any disclaimer, the term of this patent is extended or adjusted under 35 U.S.C. 154(b) by 259 days.

(21) Appl. No.: 18/256,534

(22) PCT Filed: Dec. 15, 2021

(86) PCT No.: PCT/EP2021/085955
§ 371 (c)(1),
(2) Date: Jun. 8, 2023

(87) PCT Pub. No.: WO2022/129205
PCT Pub. Date: Jun. 23, 2022

(65) Prior Publication Data

US 2024/0022858 A1 Jan. 18, 2024

(30) Foreign Application Priority Data

Dec. 16, 2020 (NL) ..................................... 2027119

(51) Int. Cl.
*H04R 7/04* (2006.01)
*H04R 25/00* (2006.01)
*H04R 29/00* (2006.01)

(52) U.S. Cl.
CPC ............. *H04R 7/04* (2013.01); *H04R 25/305* (2013.01); *H04R 29/001* (2013.01)

(58) Field of Classification Search
CPC ....... H04R 7/04; H04R 29/001; H04R 25/305
(Continued)

(56) References Cited

U.S. PATENT DOCUMENTS 8,379,899 B2 * 2/2013 Van Halteren ......... H04R 1/222 381/396
10,912,474 B2 * 2/2021 Ram .................... G01N 27/414
(Continued)

FOREIGN PATENT DOCUMENTS

EP 1850630 A2 10/2007

OTHER PUBLICATIONS

International Search Report PCT/ISA/210 and Written Opinion PCT/ISA/237 for International Application No. PCT/EP2021/085955 on Jun. 15, 2022.
(Continued)

*Primary Examiner* — Vivian C Chin
*Assistant Examiner* — Con P Tran
(74) *Attorney, Agent, or Firm* — Harness, Dickey & Pierce, P.L.C.

(57) ABSTRACT

The invention relates to a moveable element for a transducer. The moveable element is arranged to be moved indirectly or directly by a driving element of the transducer. The moveable element is arranged for outputting acoustic energy or for moving an outputting element for outputting the acoustic energy that is operatively coupled to the moveable element. The moveable element comprises at least one sensor for sensing at least one parameter of the moveable element and/or of a volume defined by a housing of the transducer. The invention further relates to a transducer comprising such a moveable element and an in-ear device comprising such a
(Continued)

transducer. The invention further relates to a method for determining the occurrence of a condition in such a transducer.

15 Claims, 10 Drawing Sheets

(58) Field of Classification Search
USPC ......... 381/332, 335, 87, 150, 396, 398, 399, 381/400, 412, 96, 91, 122; 310/12.03
See application file for complete search history.

(56) References Cited

U.S. PATENT DOCUMENTS

| | | | | |
|---|---|---|---|---|
| 2003/0048911 | A1* | 3/2003 | Furst | H04R 11/00 381/96 |
| 2015/0086027 | A1 | 3/2015 | Moser et al. | |
| 2017/0325039 | A1 | 11/2017 | Khwaja et al. | |
| 2021/0092532 | A1* | 3/2021 | Langevoort | H04R 25/505 |

OTHER PUBLICATIONS

Netherlands Search Report for NL Application No. 2027119 on Sep. 15, 2021.

WO Partial Search Report for International Application No. PCT/EP2021/085955 on Apr. 25, 2022.

Watkinson, John: "Chapter 2. Transducer drive mechanisms. 2.21 Motional Feedback", Loudspeaker and Headphone Handbook, Mar. 12, 2001, Focal Press, Oxford, ISBN: 978-0-240-51578-6.

European Office Action dated Jul. 15, 2025 for corresponding European Application No. 21840486.1.

* cited by examiner

MOVEABLE ELEMENT FOR A TRANSDUCER, TRANSDUCER, IN-EAR DEVICE AND METHOD FOR DETERMINING THE OCCURRENCE OF A CONDITION IN A TRANSDUCER

CROSS-REFERENCE TO RELATED APPLICATIONS

This application is a national phase under 35 U.S.C. § 371 of PCT International Application No. PCT/EP2021/085955 which has an International filing date of Dec. 15, 2021, which claims priority to NL Application No. 2027119, filed Dec. 16, 2020, the entire contents of each of which are hereby incorporated by reference.

The invention relates to a moveable element for a transducer, said moveable element being arranged to be moved indirectly or directly by a driving means of said transducer, said moveable element being arranged for outputting acoustic energy or for moving an outputting means for outputting said acoustic energy that is operatively coupled to said moveable element.

Such a moveable element for a transducer is known per se. In particular said moveable element may be intended and/or designed for an in-ear transducer for an in-ear device, such as a hearing aid, hearing device, hearable, earphone, earbud and the like. Such a moveable element may for example be a membrane or armature.

It is an object of the current invention to improve said known moveable element for a transducer and/or give it more functionality.

This object is met by a moveable element for a transducer according to the preamble, wherein said moveable element is characterised by comprising at least one sensor for sensing at least one parameter of the moveable element and/or of a volume defined by a housing of the transducer.

Said at least one sensor may provide the advantage that at least one parameter or characteristic of the moveable element and/or of the volume defined by said housing may be sensed. Said sensed parameter may be used in any suitable way, for example, but not limited thereto, for providing information and/or for providing a warning signal and/or recommendation.

Said parameter may be any suitable characteristic and/or parameter of the moveable element and/or said volume. This will be explained in further detail below.

As described, said at least one sensor may sense a parameter of the moveable element itself, or of said volume defined by the housing of the transducer. Said defined volume may in particular be a volume enclosed by the housing of the transducer. More in particular, said volume may for example be a volume enclosed by said housing located above, i.e. in front of, and/or below, i.e. rearwards of, said moveable element, also referred to as a front volume and/or back volume, respectively. In this respect it is noted that said sensor may be arranged on either side of the main plane of the moveable element, i.e. at the front or rear side. It is noted that said front side and rear side of the moveable element may also be referred to as a first side and second side respectively, and that the volumes may be referred to as a first volume and second volume, respectively. In this text back and front volume is used, for these are well-known terms to the skilled person.

Said sensor may be comprised by said moveable element in any suitable way. For example, said sensor may be attached to and/or embedded in and/or incorporated in said moveable element.

Said sensor may in particular be an integral part of said moveable element.

In an embodiment of the moveable element according to the invention said moveable element comprises or is defined by a printed circuit board, which printed circuit board comprises said at least one sensor.

An advantage of said printed circuit board is that the printed circuit board may further comprise other electronic components.

For example said printed circuit board may comprise a memory for storing said signal of said at least one sensor.

Said moveable element may for example comprise a flexible and/or thin layer printed circuit board arranged on said moveable element. Such a flexible and/or thin layer printed circuit board may provide the advantage of not interrupting the movement and optionally thereby the sound production of the moveable element.

Alternatively said printed circuit board may be a rigid and/or stiff printed circuit board and may thereby define the moveable element itself.

Said at least one sensor may be any suitable sensor.

Because said moveable element may in particular be intended for an in-ear transducer it is advantageous if said at least one sensor is relatively small. For example, said at least one sensor may be a micro-electromechanical sensor (MEMS) or a micromechanical sensor.

In an embodiment of the moveable element according to the invention said at least one sensor is chosen from the group comprising a (differential) microphone, pressure sensor, an accelerometer, an optical sensor, a strain sensor, a capacitive displacement sensor, a magnetic flux sensor, a Hall-effect sensor, a resistance sensor, a deformation sensor, an induction loop, an electrical current sensor, a voltage sensor, a temperature sensor, and a humidity sensor.

If more than one sensor is provided different or the same sensors may be provided, for example chosen from said above described group.

Each type of sensor is arranged for measuring a respective parameter. Said (differential) microphone may be arranged for measuring sound pressure. Said pressure sensor may be arranged for measuring either absolute or relative pressure, e.g. the pressure difference between a first volume and a second volume. Said accelerometer may be arranged for measuring acceleration. Said optical sensor may be arrange for measuring displacement or velocity. Said strain sensor (for example resistive or piezoelectric) may be arranged for measuring strain. Said capacitive displacement sensor may be arranged for measuring displacement. Said magnetic flux sensor may be arranged for measuring magnetic flux. Said Hall-effect sensor may be arranged for measuring magnetic field. Said resistance sensor may be arranged for measuring resistance. Said deformation sensor may be arranged for measuring deformation. Said induction loop may be arranged for measuring an electromagnetic field. Said electrical current sensor may be arranged for measuring electrical current. Said voltage sensor may be arranged for measuring voltage. Said temperature sensor may be arranged for measuring a temperature. Said humidity sensor may be arranged for measuring humidity.

It is noted that in particular a combination of the following sensors is advantageous: a displacement sensor, a magnetic field sensor such as the Hall-effect sensor or a magnetic sensor such as a coil, and a pressure sensor. It is preferred to use a magnetic field sensor such as the Hall-effect sensor, because this provides information about distortion of sound or magnetic saturation in the armature, or to use the magnetic sensor such as the coil which can be used for measuring the AC magnetic flux in the armature and hence provide information about the magnetic saturation in the armature, and not necessarily moveable element displacement only. It might be preferable to be able to obtain information about the magnetic static field from the magnets or the AC magnetic field in the moveable element, for instance.

In accordance with an aspect of the invention, said at least one sensor allows for detecting the occurrence of a condition in said transducer.

Examples of such conditions may be, but not limited thereto: clogging, leakage, change of acoustic load, magnetic saturation, material deformation and/or displacement.

For example if clogging is detected, it may be recommended to clean the in-ear audio device. For example, if material deformation and/or displacement is detected it may be recommended to have the device repaired.

It will be described in further detail with respect to the method according to the invention how such a condition can be detected.

Said moveable element may in particular have a fixed end zone by means of which the moveable element is held by and/or attached to the housing. Said fixed end zone may in particular be a longitudinal end zone of the moveable element. The other end zones, in particular the lateral end zones and the other, opposite longitudinal end zone, may be free end zones, i.e. not held by and/or attached to the housing. As such, the moveable element is able to move in a reciprocating manner with respect to the fixed end zone. Because the moveable element is attached to the housing with only the fixed end zone thereof, it is possible that due to a shock the moveable element moves out of its normal position or plane. For this reason it might be advantageous if a said displacement sensor is provided, such that it is possible to detect any displacement of said moveable element out of its normal position or plane. Such displacement may for example occurs after dropping the transducer comprising the moveable element.

The invention also relates to a transducer, for example an in-ear transducer for an in-ear device, such as a hearing aid, hearing device, hearable, earphone, earbud and the like, said transducer comprising a housing, said housing at least partly accommodating:

- at least one moveable element as described above in any one or more of the above described embodiments and/or having any one or more of the above described features, in any suitable combination, and
- a driving means for indirectly or directly moving said at least one moveable element.

Advantages and/or embodiments and/or features of such a transducer and in particular the moveable element thereof are described above with respect to the at least one moveable element.

As described above, said housing may define said front and/or back volume located at the front and/or rear side of the moveable element, respectively.

In an embodiment of the transducer according to the invention said transducer further comprises a memory operatively coupled to said at least one sensor for storing at least one parameter as sensed by means of the at least one sensor, said memory for example being comprised by said at least one moveable element or arranged at any suitable location within said housing.

In an embodiment of the transducer according to the invention said transducer comprises:

- a moveable membrane, and/or
- a moveable armature, wherein optionally said moveable armature is operatively coupled to said membrane, said armature being driven by said driving means;

wherein said at least one moveable element that comprises said at least one sensor is defined by said moveable membrane and/or said moveable armature.

It will be thus clear for the skilled person that either said membrane may comprise said at least one sensor, or said armature may comprise said at least one sensor, or both said membrane and said armature may comprise said sensor.

It is noted that different types of transducers are known. In a first type said transducer comprises said armature as the drivable moveable element, wherein the armature drives the moveable membrane. A driving pin may be provided that connects the armature to the membrane. In this first type it is the membrane that produces the acoustic energy. In this first type of transducer either said membrane may comprise said at least one sensor, or said armature may comprise said at least one sensor, or both said membrane and said armature may comprise said sensor. In a second type of transducer the membrane is combined with the driveable armature as one single element that produces the acoustic energy. In this second type it is the armature that comprises the sensor.

The invention also relates to an in-ear device, for example a hearing aid, hearing device, hearable, earphone, earbud and the like, said in-ear device comprising:

- a transducer as described above in any one or more of the above described embodiments and/or having any one or more of the above described features, in any suitable combination,
- a processor operatively coupled to said memory for receiving and processing said at least one parameter.

Advantages and/or embodiments and/or features of such an in-ear device and in particular the transducer and/or moveable element thereof are described above with respect to the transducer and/or the at least one moveable element.

Said processor may be arranged at any suitable location in or on the in-ear device, for example in a housing of the in-ear device and/or in the housing of the transducer and/or on the printed circuit board of the moveable element.

As described, said processor may be arranged for processing said at least one parameter, in particular as stored in and received from said memory.

It is noted that the in-ear device can be any type of in-ear device, for example any one of the examples listed above or any other type of device not explicitly described. In-ear is a well-known term for the skilled person and can at least be understood to be a device that is at least partly inserted into the ear in use of the device, in particular at least partly into the ear canal. More in particular for example the transducer may be inserted into the ear, for example as part of a so-called receiver in canal (RIC) or receiver in ear (RIE).

In an embodiment of the in-ear device according to the invention said processor is arranged to perform the steps of:

a) driving said transducer by providing a driving signal to said transducer;
b) receiving said at least one parameter by means of said at least one sensor;
c) determining a transfer function of the driving signal to said at least one parameter;
d) comparing said transfer function with a stored transfer function that is stored in said memory or a further memory, and
e) determining if a condition has occurred based on said comparison, in particular based on an optional deviation between said transfer function and said stored transfer function.

Advantages of such an in-ear device will be provided below with respect to the method according to the invention.

Said further memory may for example be a memory of the in-ear device.

Said processor may further be arranged to perform any one or more of the additional steps as describe below with respect to the method according to the invention. Further examples, explanations, details of the method according to the invention as described below may apply to the in-ear device as well in an equivalent manner as will be clear for the skilled person.

The invention also relates to a method for determining the occurrence of a condition in a transducer of an in-ear device, such as a hearing aid, hearing device, hearable, earphone, earbud and the like, wherein the method comprises the steps of:

a) driving said transducer by providing a driving signal to said transducer;
b) sensing at least one parameter of a moveable element of the transducer and/or of a volume defined by a housing of the transducer by means of at least one sensor comprised by the moveable element;
c) determining a transfer function of the driving signal to said at least one parameter;
d) comparing said transfer function with a stored transfer function that is stored in a memory of the transducer or the in-ear device, and
e) determining if a condition has occurred based on said comparison, in particular based on an optional deviation between said transfer function and said stored transfer function.

Said driving signal in step a) may for example be a driving voltage V or driving current I. In use of the transducer, i.e. when a sound pressure is to be outputted by said transducer, said driving signal may be provided substantially continuously to said transducer in order to generate said output. Said at least one parameter sensed in step b) may be any suitable parameter, examples of which are described above with respect to the moveable element according to the invention. By determining the driving signal to parameter transfer function based on said parameter sensed in step b) and the driving signal at that time, an optional change or deviation in the driving signal to parameter transfer function can be determined by comparing this driving signal to parameter transfer function with the stored driving signal to parameter transfer function. Based on this comparison and in particular based on said optional change or deviation in the transfer function with respect to the stored transfer function it is possible to determine if a condition, and in particular a disturbing condition, has occurred. In other words, a said change or deviation in the actual transfer function with respect to the stored transfer function may indicate that a said condition has occurred.

Said steps can be performed in any suitable order and preferably in the order a) to e). If desired said method may comprise further or intermediate steps.

Said sensor as used in step b) may the sensor that is comprised by the moveable element of claims 1-6.

Said parameter as measured in step b) may be stored in the memory of the transducer, which memory may be operatively coupled to the processor of the in-ear device as described above.

Detection that said condition has occurred may be used in any suitable way. For example as information provided to the user, manufacturer, maintenance person or any other relevant person or company. Alternatively or additionally detection of the occurrence of said condition may result in a warning signal and/or a recommendation being provided.

It is noted that the transfer function that is determined in step c) may also be stored in said memory as a further transfer function. By storing said further transfer function, in particular said further transfer functions if the method according to the invention is performed more than once, an optional degradation in said transfer function can be detected.

In an embodiment of the method according to the invention said stored transfer function is obtained by sensing said at least one parameter at default transducer conditions and by determining said transfer function of the driving signal to said at least one parameter at said default transducer conditions, and by storing this transfer function in said memory.

The driving signal to parameter transfer function determined at said default conditions may for example be referred to as a default or reference driving signal to parameter transfer function.

Said reference transfer function to be determined and stored in said memory may be a typical transfer function for the design of the system and thus for a certain type of transducer. Obtaining and storing the reference transfer function may thus not need to be performed for each individual transducer, but may be performed for a typical transducer and then stored, i.e. programmed, in the memory of each individual transducer or in-ear device.

Alternatively said reference transfer function may be determined for each individual transducer after manufacturing, wherein the components of the transducer are tested in a standardized test setup and the individually determined transfer function may be stored in the memory of that individual transducer or in-ear device.

Alternatively said reference transfer function may be determined for each individual user for the transducer as built in the device of that user and the individually determined transfer function may be stored in the memory of that individual transducer or in-ear device.

In an embodiment of the method according to the invention at least one threshold value is defined and wherein it is determined in step e) that said condition has occurred when said deviation between said transfer function and said stored transfer function is equal to or exceeds said at least one threshold value.

In this embodiment a small deviation in the transfer function with respect to the stored transfer function, i.e. below said at least one threshold value, may be deemed acceptable and no disturbing condition is determined. If said deviation is equal to or exceeds said at least one threshold value it is determined that said condition has occurred.

If desired multiple threshold values could be defined, wherein detection of the occurrence of the condition may result in different actions based on which threshold value is met or exceeded. For example, if said deviation is equal to or exceeds a first, relatively low threshold value, said detection of the occurrence of said condition may be presented as mere information. For example, if said deviation is equal to or exceeds a second, higher threshold value, said detection of the occurrence of said condition may result in a warning signal being provided or optionally a first type of warning signal and/or in the recommendation for preventive or corrective maintenance. For example, if said deviation is equal to or exceeds a third, highest threshold value, said detection of the occurrence of said condition may result in a second type of warning signal being provided and/or the recommendation of immediate preventive or corrective maintenance. For example said first type of warning signal could be an orange light and the second type of warning signal could be a red light. It will be clear for the skilled person that any suitable and/or desired number of threshold values could be defined and any suitable and/or desired results and/or actions therefrom, and that the above examples are only explanatory and not limiting.

In another embodiment of the method according to the invention the method comprises a further step f) of determining which type of condition has occurred based on the degree of deviation between said transfer function and said stored transfer function and/or the frequency range where the deviation occurs and/or the amplitude range where the deviation occurs.

An advantage of determining which type of condition has occurred may result in providing specific information and/or a specific recommendation to the user, manufacturer, etc.

Examples of said types of conditions may be, but not limited thereto: clogging, leakage, change of acoustic load, magnetic saturation, material deformation and/or displacement. For example if clogging is detected, it may be recommended to clean the in-ear audio device. For example, if material deformation and/or displacement is detected it may be recommended to have the device repaired.

In another embodiment of the method according to the invention a signal from the sensor and/or the driving signal is/are subjected to signal conditioning, such that only signals within a certain frequency range and/or within a certain amplitude range are used to determine said transfer function.

This may provide the advantage of increasing the accuracy and/or liability of the method.

Performing the method according to the invention may be battery consuming for the in-ear device. It is therefore intended to perform said method at suitable occasions and/or timing, in particular only at said suitable occasions and/or timing. For example, performing the method may take place at any one or more of the following occasions:

- the replacement of a battery of the in-ear audio device;
- when the in-ear audio device is powered up;
- regular time intervals;
- the request of a host device, i.e. the in-ear audio device, and
- the request of the user or any other person.

It will be clear for the skilled person that even though these occasions are suitable and/or well-chosen occasions for performing the method, said method may be performed at any other suitable occasion or time.

A starting trigger may be provided for starting the method according to the invention.

Said regular time intervals may be chosen as desired, for example daily, weekly, monthly, or any other desired time interval.

In an embodiment of the method according to the invention said method comprises the further steps of:

g) determining a driving signal to pressure transfer function based on said driving signal and said at least one measured parameter at said default transducer conditions and storing said driving signal to pressure transfer function in said memory;

h) determining said driving signal to pressure transfer function based on said driving signal of step a) and said at least one parameter of step b).

Based on said driving signal and measured parameter a driving signal to pressure, i.e. sound pressure, transfer function may also be derived. Such a transfer function is a function indicative of the sound pressure that results from a certain driving signal. In accordance with the invention this driving signal to pressure transfer function may also be determined and stored at said default condition and/or determined using said at least one parameter as obtained in step b) and the actual driving signal of step a).

The invention will be further elucidated with reference to figures, wherein:

FIGS. 1A-1D show a first embodiment of a transducer according to the invention, wherein FIG. 1A shows a perspective schematic view, FIG. 1B shows an exploded schematic perspective view, and wherein

FIGS. 3A-3D show a third embodiment of a transducer according to the invention, wherein FIG. 3A shows a perspective schematic view, FIG. 3B shows a cross section, and wherein FIGS. 3C and 3D show the movement of the moveable element according to an embodiment of the invention;

Figure 7B:
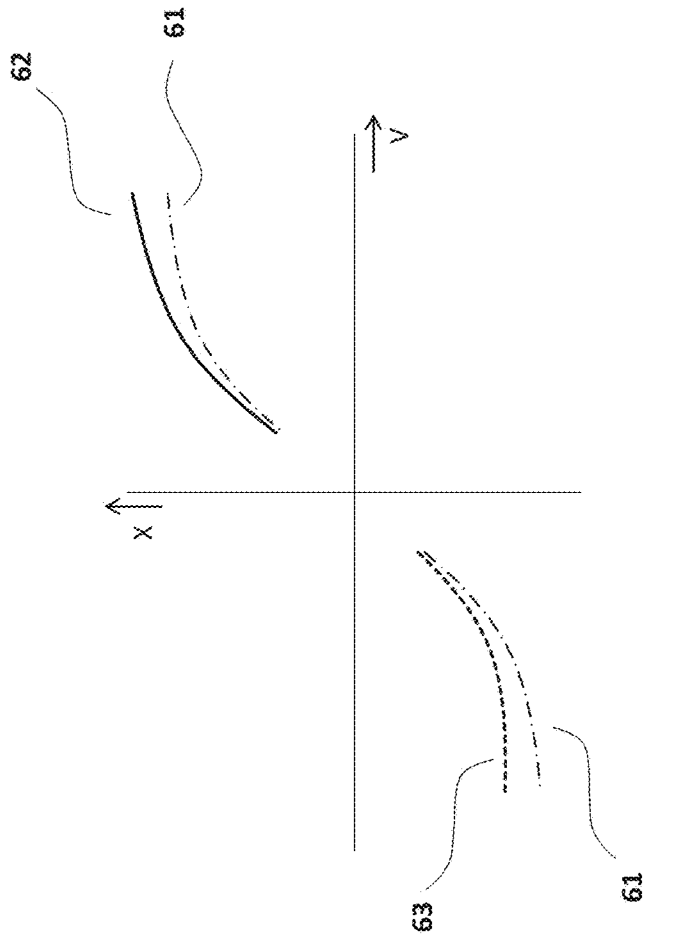
Figure 7A:
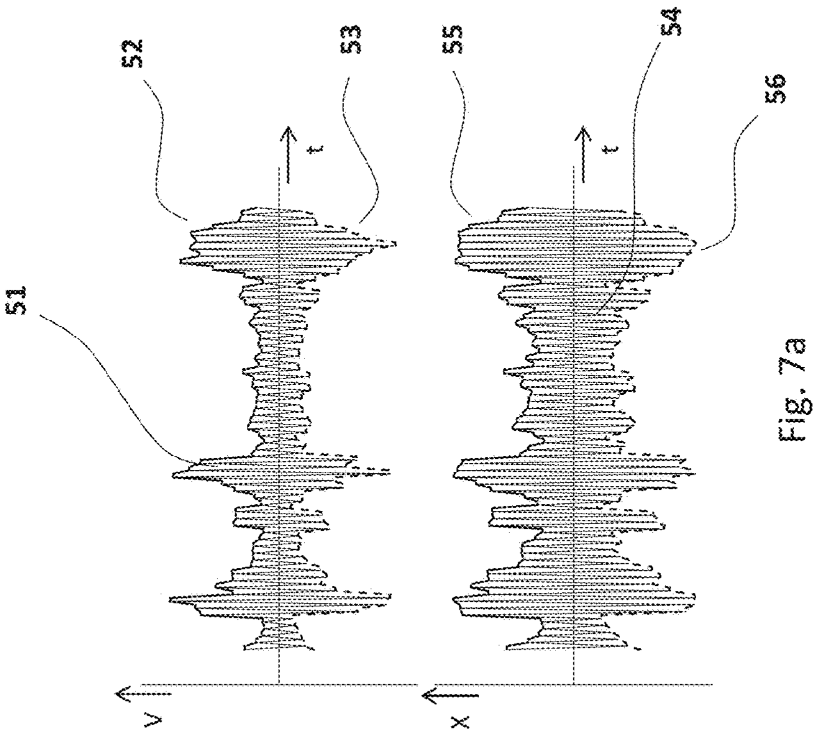
Figure 8:
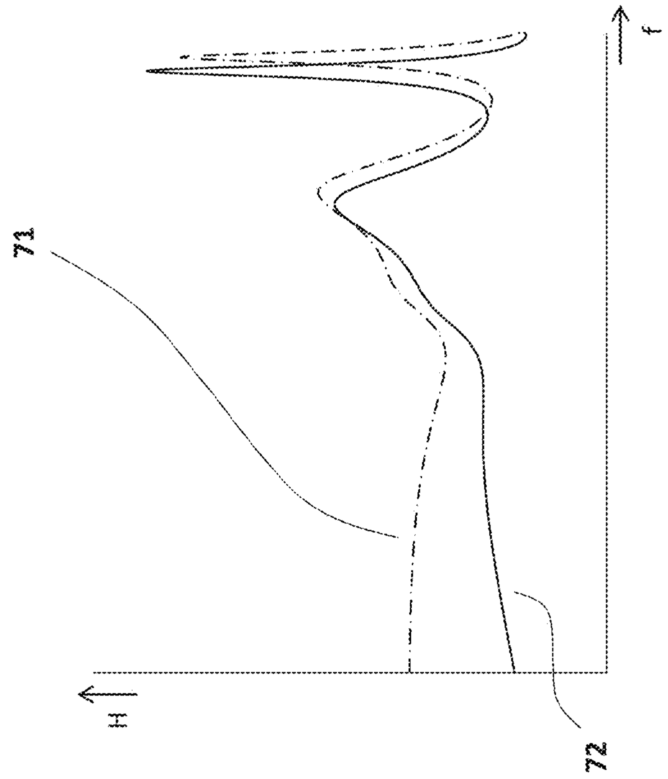

FIGS. 7*a* and 7*b* show an example of the acquisition of an amplitude transfer function and the related diagnostics, and FIG. 8 shows an example of the acquisition of a frequency transfer function and the related diagnostics.

In the FIGS. 1A-1D, 2A and 2B, and 3A-3D, same or similar features are denoted by same reference numerals.

FIGS. 1A-1D show a transducer 1 for an in-ear device. Said transducer 1 comprises a housing 2 accommodating a membrane 3 as a moveable element of the transducer that produces acoustic energy. It is noted that only a lower part of the housing 2 is shown in FIGS. 1A-1D. An upper part of the housing 2 may be arranged on top of the lower part. Said housing 2 encloses a back volume at a rear side of the membrane 3 and a front volume at an upper side of the membrane 3, wherein in the FIGS. 1A-1D the upper side of the membrane 3 is best shown. On the rear side of the membrane 3 a foil 4 is arranged, said foil 4 sealing off an area between the circumference of the membrane 3 and the housing 2, such that the front volume is sealed with respect to the back volume and no air can flow between the two volumes. In the exemplary embodiment of FIGS. 1A-1D the membrane 3 is formed by a rigid printed circuit board (PCB). Said PCB comprises a memory 5 and two sensors 6 attached thereon, in particular on the upper side thereof, such that said sensors 6 and memory 5 form an integral part of the membrane 3 as defined by the PCB. Said sensors are arranged for sensing at least one parameter of the membrane 3 and/or of the front volume. Said sensors could be any suitable sensors. Two recesses 7 are arranged in a side of the lower part of the housing 2 that provide access to the inner volume of the housing from outside of the housing. For example at least one wire and/or part of the PCB may be guided through the recesses 7, thereby providing a connection between the PCB arranged within the housing 2 and the outside of the housing 2.

Figure 1B:
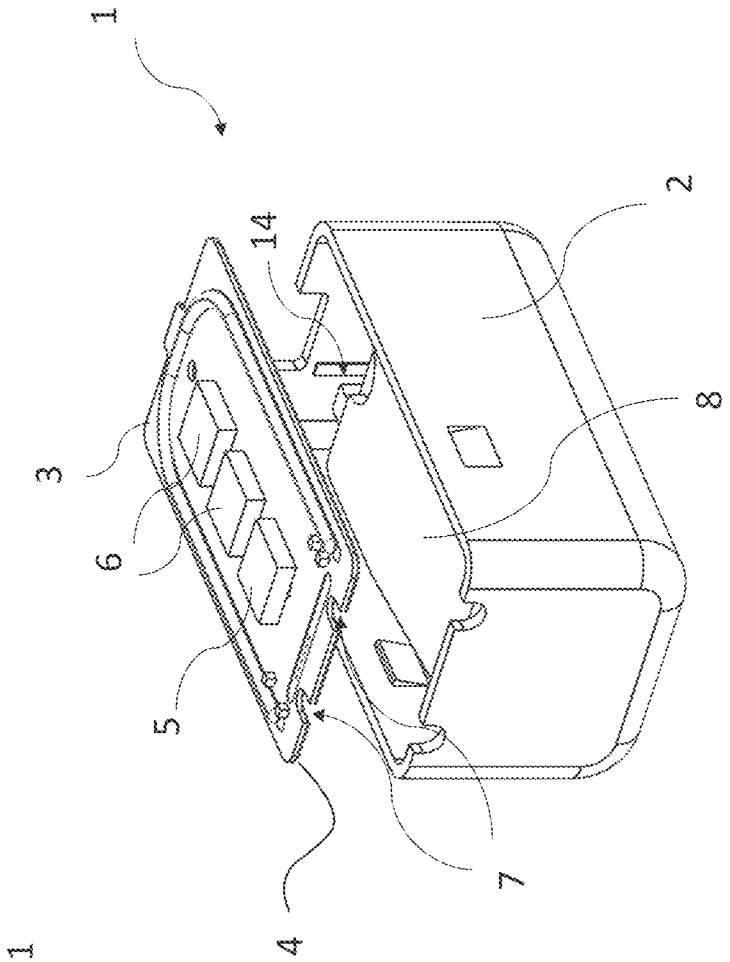

FIG. 1B further shows an armature 8 arranged within the housing 2. Said armature 8 is also a moveable part of the transducer 1 and can be driven by a driving means 14. Said armature is connected to said membrane 3, for example via a driving pin (not shown), such that said membrane can be moved by said armature.

Figure 1A:
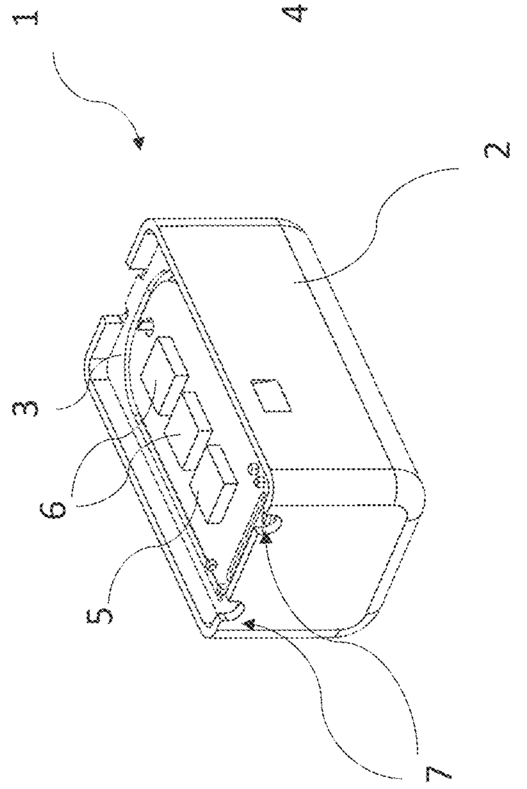
Figure 1D:
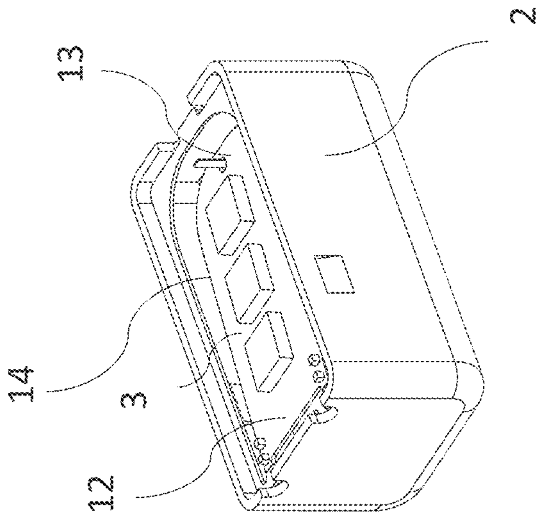
Figure 1C:
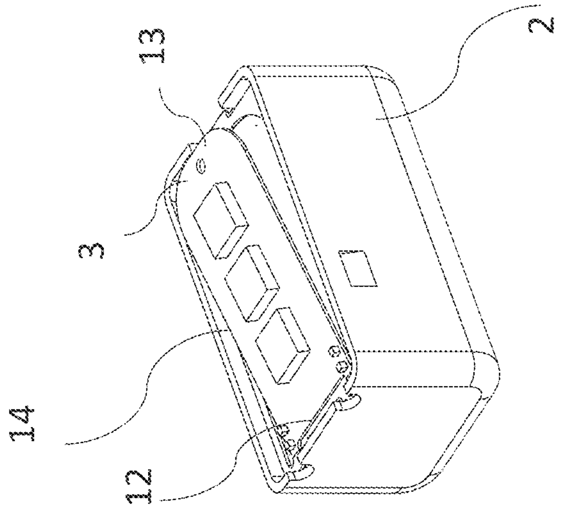

FIGS. 1C and 1D show that the membrane 3 comprises a fixed longitudinal end zone 12 by means of which the membrane 3 is held by and therefore attached to the housing 2. As a result of the membrane 3 being held by only one longitudinal end zone thereof, while the other end zones, i.e. the lateral end zones 14 and the other, opposite longitudinal end zone 13, are free end zones, i.e. not attached to the housing 2, the membrane 3 is able to move in a reciprocating manner with respect to the fixed end zone 12. The membrane 3 is in particular moveable in such a manner that it is moveable out of its normal plane in two directions with respect to this normal plane. The normal plane may be defined here as the plane in which the membrane 3 extends at rest, i.e. when the transducer is not in use. The membrane 3 thus moves in a reciprocating manner out of this normal plane in one direction, then back into this normal plane, then out of this normal plane in the other direction, then back to the normal plane, etc.

As described above, the armature 8 is the moveable element part that is driven by said driving means and the membrane 3 that is connected to the armature 8 moves together with the armature 8. In a similar manner as the membrane 3 the armature 8 comprises a fixed end by means of which it is held by the housing, such that the armature 8 is able to move in a reciprocating manner with respect to the fixed end zone thereof in a similar manner as described above with respect to the membrane 3.

It is noted that as a result of a shock the membrane 3 and/or armature 8 may move, i.e. displace, out of their normal planes into a respective displaced normal plane, which displaced normal plane will be the plane in which the membrane 3 and/or armature 8 extends at rest after the shock. This displacement from the normal plane to the displaced normal plane may be measured by said sensors 6, in particular for example by a displacement sensor.

It is noted that the sensors 6 are shown to be on the upper side of the membrane 3, but could alternatively or additionally be arranged on the lower side of the membrane 3. It is further noted that two sensors 6 are shown, but that it will be clear for the skilled person that any desired number of sensors 6 could be provided. It is further noted that the armature 8 of this exemplary embodiment does not comprise any sensor, but alternatively or additionally the armature could comprise at least one sensor 6.

Figure 2B:
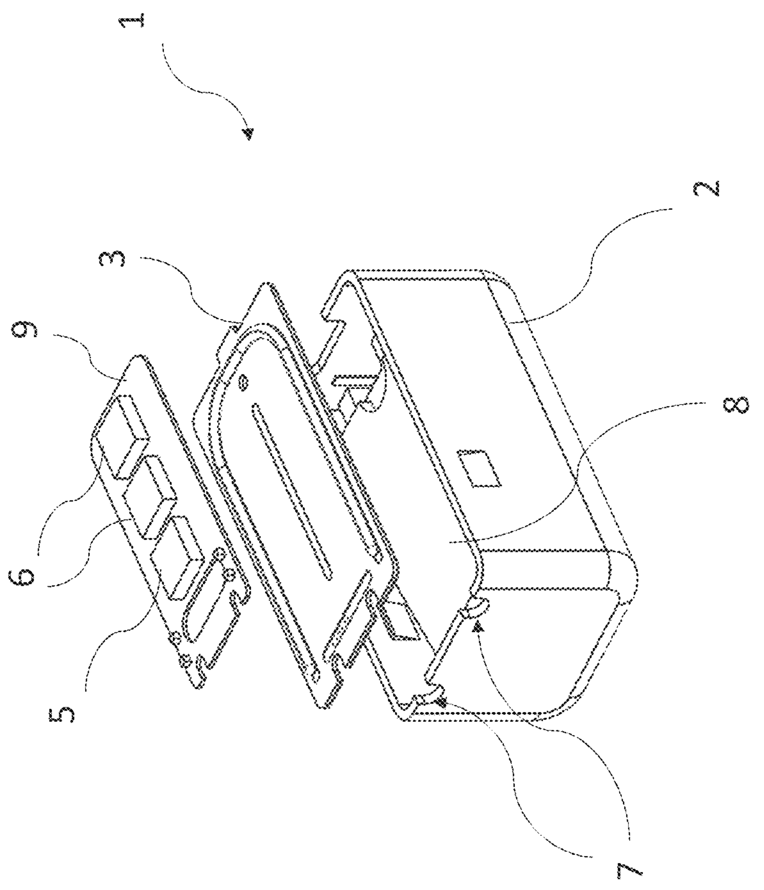
FIGS. 2A and 2B show a-perspective schematic view and an exploded perspective schematic view respectively, of a second embodiment of a transducer according to the invention.
Figure 2A:
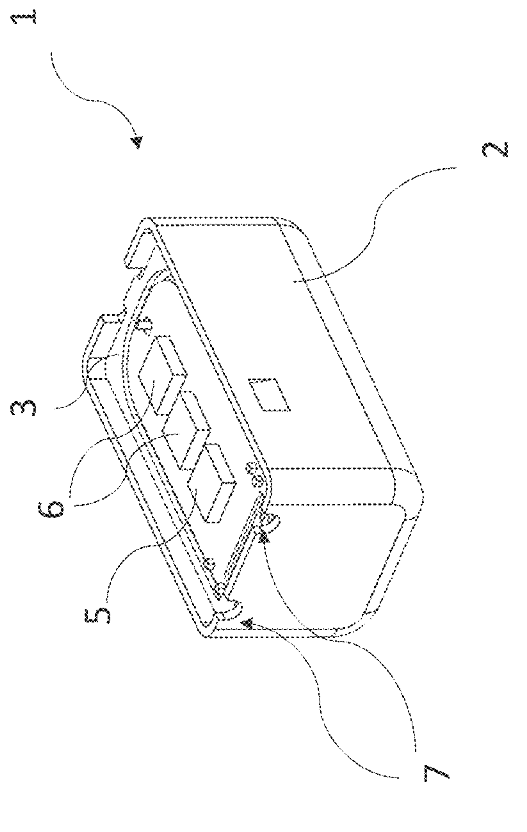

FIGS. 2A and 2B show a second embodiment of the transducer 1. Only the differences with respect to the first embodiment of FIGS. 1A-1B will be described here. For a further description of the transducer 1 of FIGS. 2A-2B the reader is referred to the description of FIGS. 1A-1B.

The membrane 3 of FIGS. 2A and 2B differs from the membrane 3 of FIGS. 1A-1B in that it comprises a well-known membrane 3, wherein a flexible and/or thin printed circuit board (PCB) 9 is arranged thereon. Said PCB 9 comprises said two sensors 6 and memory 5, as described with respect to FIGS. 1A-1B.

FIGS. 3A-3D show a third embodiment of the transducer 1. Only the differences with respect to the first embodiment of FIGS. 1A-1D and FIGS. 2A-2B will be described here. For a further description of the transducer 1 of FIGS. 3A-3D the reader is referred to the description of FIGS. 1A-1D and 2A-2B, respectively.

FIGS. 3A-3D show a transducer 1 in which no membrane is provided but wherein the armature 8 produces the acoustic energy. In this embodiment it is the armature 8 that comprises in this exemplary embodiment two flexible and/or thin printed circuit boards (PCBs) 9 that are arranged on both the upper and lower side thereof. Each said PCB 9 comprises a said sensor 6. No memory 5 is shown in FIG. 3 but a said memory could be provided and if provided could be located at any suitable location, for example also on both or any one of the PCBs 9, elsewhere in the housing 2 or even outside of the housing 2.

Figure 3B:
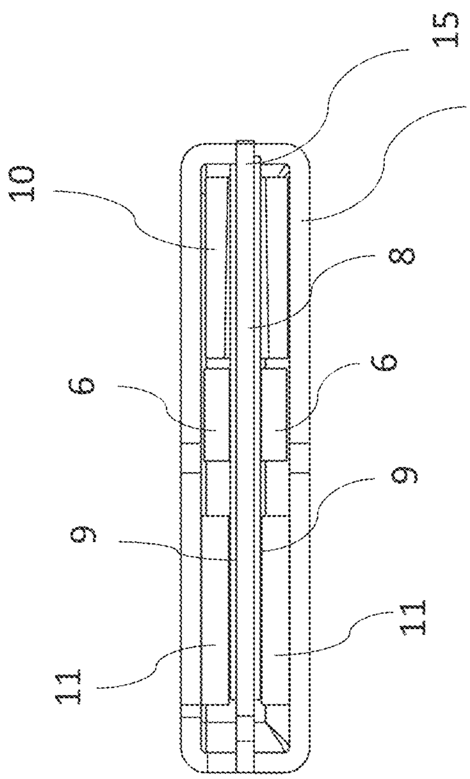
Figure 3A:
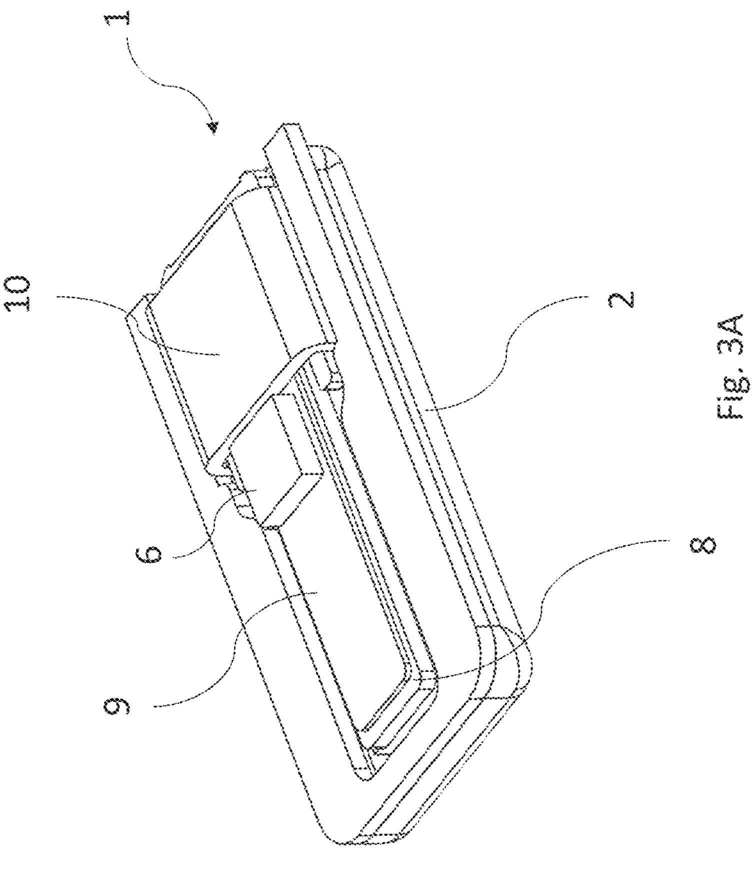

FIG. 3B in particular further shows a coil 10, formed by magnets 11, that drives the armature 8. It is noted that said sensor 6 and/or memory 5 and/or other electronic components could also be arranged on any of the PCBs 9 below the coil 10, which would increase the thickness of the transducer 1 but would provide more space on the PCB 9 for electronic components. FIG. 3B further shows that the armature 8 comprises a fixed longitudinal end zone 15 by means of which the armature 8 is held by the housing 2.

Figure 3D:
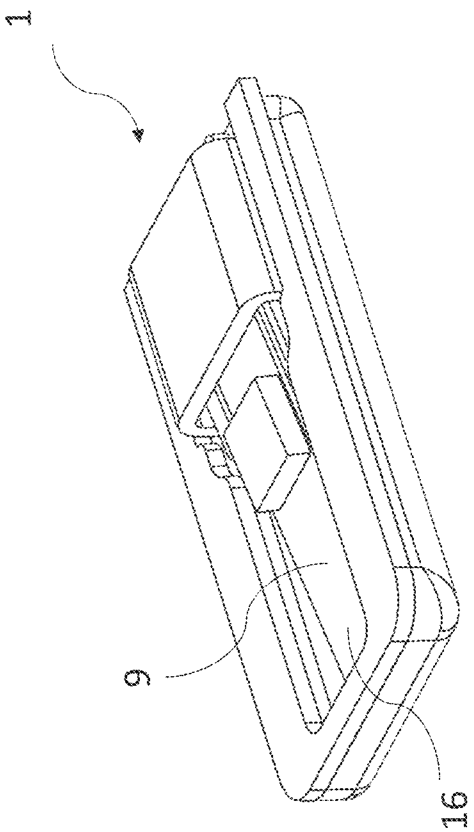
FIGS. 3C and 3D show the movement of a moveable element according to a first embodiment of the invention.
Figure 3C:
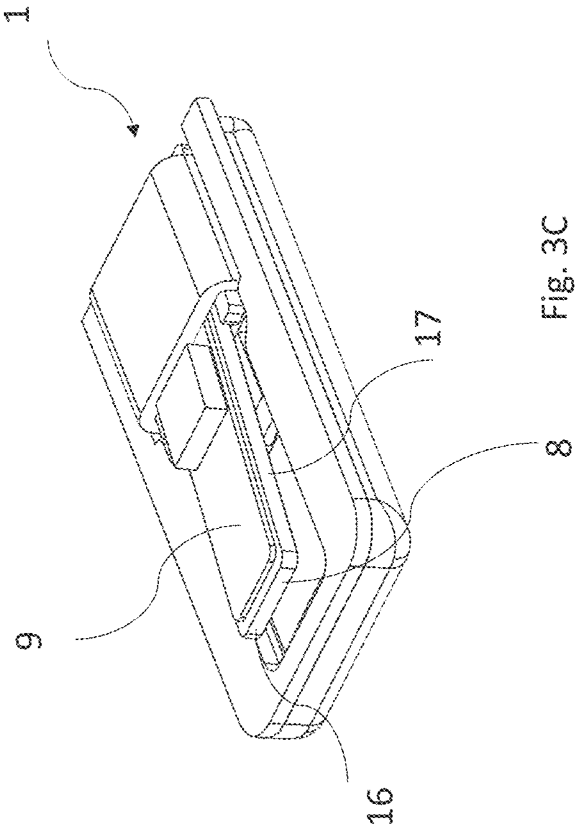

FIGS. 3C and 3D in particular show that the armature 8 is able to move in a reciprocating manner with respect to the fixed end zone 15, in a similar manner as described above with respect to FIGS. 1C and 1D with respect to the membrane 3. FIGS. 3C and 3D further show that the lateral end zones 17 and opposite longitudinal end zone 16 are free end zones, i.e. not attached to the housing.

The transducers 1 of any of the three embodiments shown in FIGS. 1-3 could be part of an in-ear device. Said in-ear device is not shown in the figures but is well known to the skilled person. Said in-ear device could be any in-ear device, such as, but not limited thereto, a hearing aid, hearing device, hearable, earphone, earbud and the like.

Figure 4:
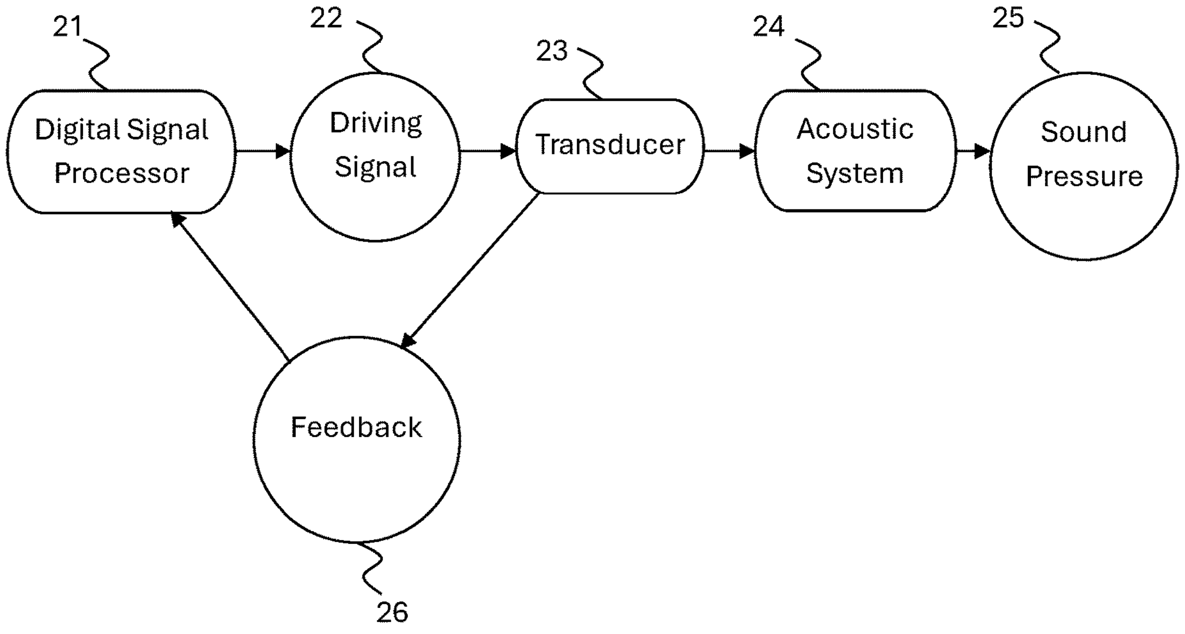
FIG. 4 shows a block diagram for a transducer system according to the invention.

FIG. 4 shows a block diagram for a transducer system, for example any of the transducers of any of the three embodiments shown in FIGS. 1-3. This figure shows that a Digital Signal Processor (DSP) 21, in this embodiment comprised by the in-ear device that comprises the transducer, is arranged to drive said transducer 23 by providing a driving signal 22 to said transducer 23. Said driving signal 22 could be voltage or current. Said transducer 23 defines an acoustic system 24 which outputs a sound pressure 25. Said transducer 23 comprises at least one sensor comprised by the moveable element thereof that senses a parameter of the moveable element and/or of a volume defined by the housing of the transducer and provides a sensor signal, which sensor signal is provided as feedback 26 to the DSP 1.

Figure 5:
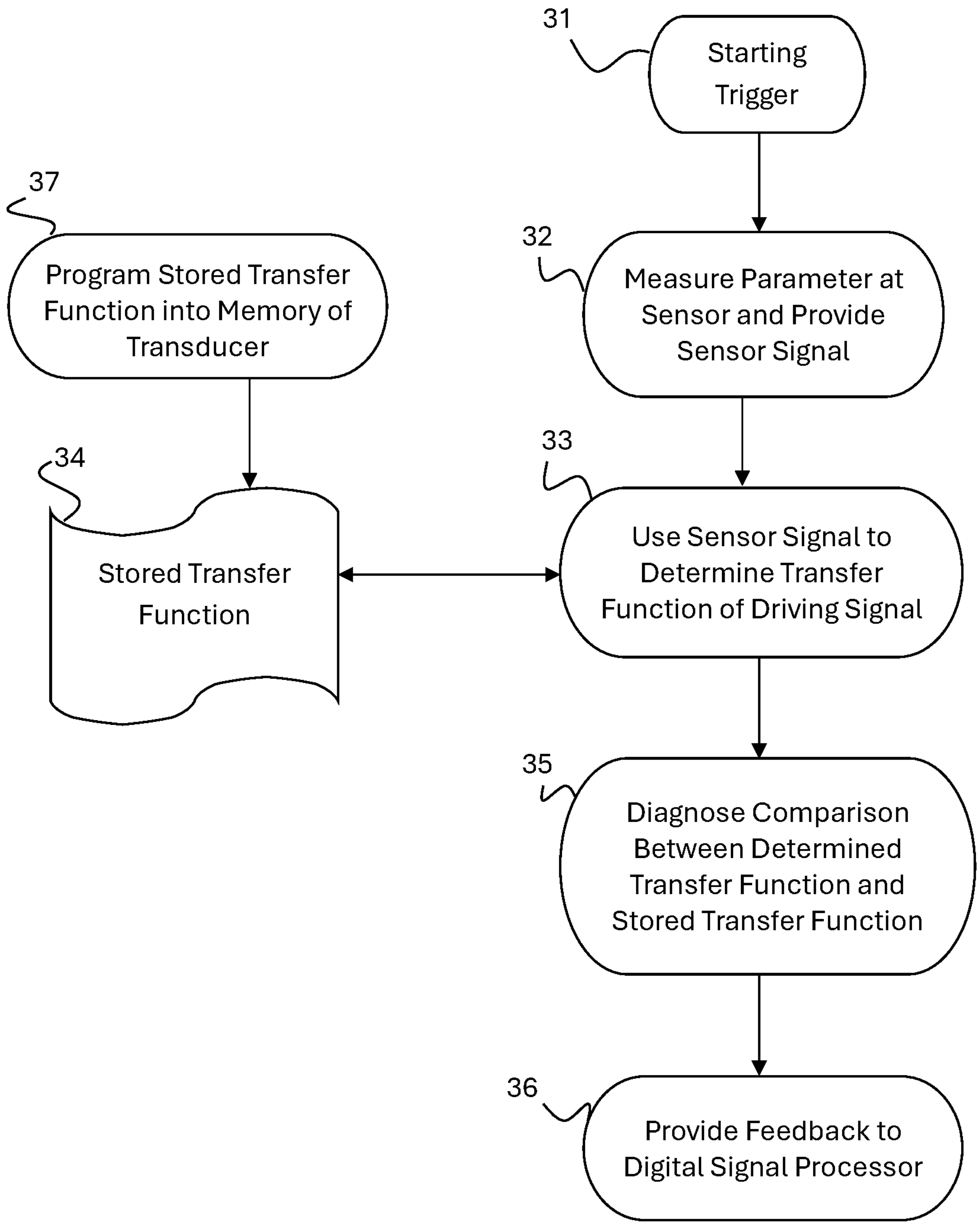
FIG. 5 shows the steps of the method according to the invention.

FIG. 5 shows the steps of the method according to the invention in more detail, which is in particular shown here in the form of a top level algorithm from timing of signal acquisition to feeding back after comparing stored and acquired transfer function. At a starting trigger 31 said sensor is arranged to measure a said parameter and to provide said sensor signal in step 32. In step 33 this sensor signal of step 32 is used for determining a transfer function of the driving signal to this further parameter. This determined transfer function is compared to a stored transfer function 34. The stored transfer function may be obtained by sensing said parameter at default transducer conditions and by determining said transfer function of the driving signal to said at least one parameter at said default transducer conditions, and by programming this transfer function into the memory of the transducer in step 37. Step 35 is a diagnosing step in which the comparison between the determined transfer function of step 33 and the stored transfer function of step 34 is diagnosed. In step 36 feedback is provided to the DSP, for example DSP 21 of FIG. 4.

Said starting trigger 31 may for example be provided at the replacement of a battery of the in-ear device and/or when the in-ear device is powered up and/or—on regular time intervals and/or at the request of a host device, and/or at the request of the user or any other person.

Figure 6:
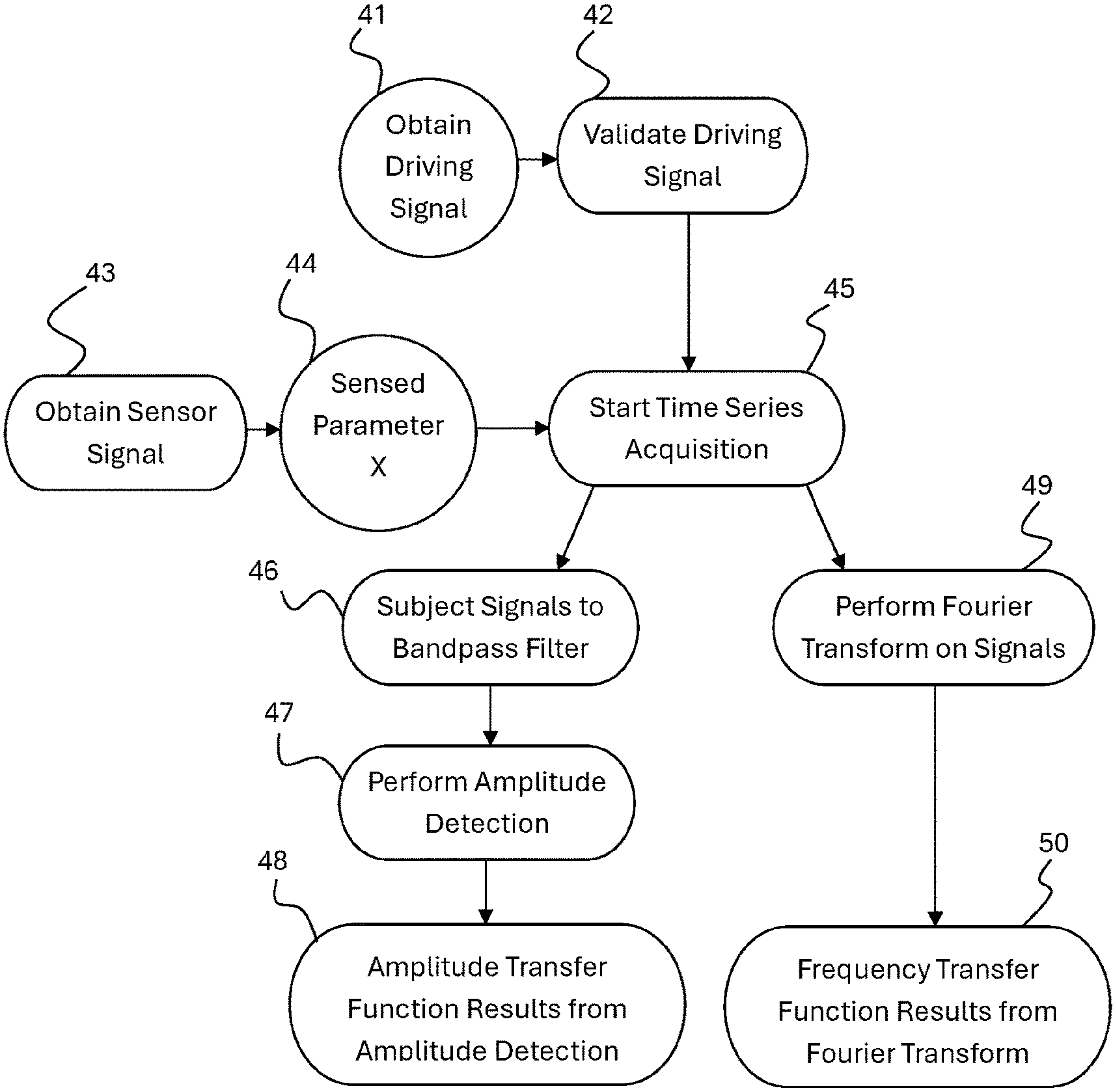
FIG. 6 shows a transfer function acquisition process for linear cases and for non-linear cases.

FIG. 6 shows the transfer function acquisition process for linear cases 45, 49, 50 and for non-linear cases 45, 46, 47, 48. In step 41 said driving signal is obtained, which is validated in step 42. In step 43 said sensor signal is obtained, which results in sensed parameter X in step 44. In step 45 a time series acquisition is started separately or simultaneously for said linear cases 45, 49, 50 and non-linear cases 45, 46, 47, 48. For the non-linear cases said signals are subjected to a bandpass filter in step 46, after which amplitude detection is performed in step 47 resulting in an amplitude transfer function in step 48. For the linear cases a Fourier transform is performed on the acquired signals in step 49, which results in a frequency transfer function 50.

FIGS. 7*a* and 7*b* show an example of the acquisition of an amplitude transfer function and the related diagnostics. In this example the acquired parameter X can be a displacement of a moveable element of the transducer, such as a membrane or armature, or the magnetic flux in the armature of a balanced armature transducer, or the pressure in a back volume of a loudspeaker, etc. FIG. 7*a* shows the time series of driving voltage V 51 and parameter X 54 after bandpass filter 46, and positive and negative amplitudes 52, 53, 55, 56 of these signals after amplitude detection 47. In particular FIG. 7*a* shows positive voltage amplitude 52, negative voltage amplitude 53, positive parameter amplitude 55, and negative parameter amplitude 56.

FIG. 7*b* shows the acquired positive amplitude transfer function 62, calculated from positive voltage amplitude 52 and positive parameter amplitude 55, and the acquired negative amplitude transfer function 63, calculated from negative voltage amplitude 53 and negative parameter amplitude 56, in comparison with the stored amplitude transfer function 61 between drive voltage V and parameter X. In this example the acquired amplitude transfer function 62, 63 clearly deviates from the stored amplitude transfer function 61 and in particular the deviation may exceed at least one chosen threshold, from which it may be concluded that the moveable element is displaced relative to its default position, e.g. due to plastic deformation caused by mechanical shock. As a consequence of this deformation, the transducer shows a certain degree of asymmetry in the amplitude transfer function and in FIG. 7*b* such an asymmetry appears in quadrants I and III.

FIG. 8 shows example of a frequency transfer function and the related diagnostics. In this example the acquired parameter X can be displacement of the moveable element of the transducer, or the magnetic flux in the armature of a balanced armature receiver, or the pressure in the back volume of a loudspeaker, etc. In this example the acquired frequency transfer function 72 clearly deviates from the stored frequency transfer function 71 and in particular the deviation may exceed at least one chosen threshold, from which may be concluded that the volume of the acoustic system is increased and/or that the leakage of the system is increased relative to the default. This example shows how the disturbing condition is affecting the amplitude of the transfer function as well as the resonance peak frequencies.

Although the invention has been discussed in the foregoing with reference to an exemplary embodiment of the system of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

The invention claimed is:

1. A transducer, said transducer comprising:
- a housing, said housing at least partly accommodating:
  - at least one moveable element, and
  - a driving means for indirectly or directly moving said at least one moveable element,
  - wherein
    - said at least one moveable element is arranged to be moved indirectly or directly by said driving means,
    - said at least one moveable element is arranged for outputting acoustic energy or for moving an outputting means for outputting said acoustic energy that is operatively coupled to said at least one moveable element, and
    - said at least one moveable element includes at least one sensor for sensing at least one parameter of the at least one moveable element and/or of a volume defined by the housing; and
- a memory operatively coupled to said at least one sensor, the memory for storing the at least one parameter as sensed by means of the at least one sensor.

2. The transducer according to claim 1, wherein said memory is comprised by said at least one moveable element.

3. The transducer according to claim 1, wherein said memory is arranged at any suitable location within said housing.

4. The transducer according to claim 1, wherein said at least one sensor is an integral part of said at least one moveable element.

5. The transducer according to claim 1, wherein said at least one moveable element comprises or is defined by a printed circuit board.

6. The transducer according to claim 5, wherein said printed circuit board comprises said at least one sensor.

7. The transducer according to claim 1, wherein said at least one sensor is a micro-electromechanical sensor.

8. The transducer according to claim 1, wherein said at least one sensor is micromechanical sensor.

9. The transducer according to claim 1, wherein said at least one sensor includes at least one of a microphone, a pressure sensor, an accelerometer, an optical sensor, a strain sensor, a capacitive displacement sensor, a magnetic flux sensor, a Hall-effect sensor, a resistance sensor, a deformation sensor, an induction loop, an electrical current sensor, a voltage sensor, a temperature sensor, or a humidity sensor.

10. The transducer according to claim 1, wherein said transducer further comprises:
- a moveable membrane, and/or
- a moveable armature.

11. The transducer according to claim 10, wherein,
- said moveable armature is operatively coupled to said moveable membrane, said moveable armature being driven by said driving means, and
- said at least one moveable element is defined by said moveable membrane and/or said moveable armature.

12. The transducer according to claim 1, wherein said at least one sensor allows for detecting an occurrence of a condition in said transducer.

13. The transducer of claim 1, wherein the transducer is an in-ear transducer for an in-ear device, the in-ear device being one of a hearing aid, a hearing device, a hearable, an earphone, or an earbud.

14. An in-ear device, comprising:

the transducer according to claim 1, and a processor operatively coupled to said memory for receiving and processing said at least one parameter.

15. The in-ear device according to claim 14, wherein the in-ear device forms part of a hearing aid, a hearing device, a hearable, an earphone, or an earbud.

* * * * *